United States Patent
Kozlov et al.

[15] 3,665,193
[45] May 23, 1972

[54] DIAMOND NUCLEAR RADIATION DETECTOR

[72] Inventors: Stanislav Fedorovich Kozlov; Elena Alexandrovna Konorova, both of Moscow, U.S.S.R.

[73] Assignee: Ordena Lenina Fizichesky Institut Imeni P. N. Lebedeva Leninsky Prospekt, Moscow, U.S.S.R.

[22] Filed: Mar. 28, 1968

[21] Appl. No.: 716,953

[30] Foreign Application Priority Data

Mar. 29, 1967  U.S.S.R..............................1,144,951

[52] U.S. Cl......................................250/83 R, 317/234 Z
[51] Int. Cl.............................................G01t 1/202
[58] Field of Search..........................250/83, 83.3; 317/234

[56] References Cited

UNITED STATES PATENTS

| | | | |
|---|---|---|---|
| 2,760,078 | 8/1956 | Yoamans | 250/83.3 |
| 2,765,385 | 10/1956 | Thompson | 250/83.3 X |
| 3,113,220 | 12/1963 | Goulding et al. | 250/83.3 X |
| 3,212,940 | 10/1965 | Blankenship | 250/83.3 UX |

*Primary Examiner*—James W. Lawrence
*Assistant Examiner*—Morton J. Frome
*Attorney*—Waters, Roditi, Schwartz & Nissen

[57] ABSTRACT

A diamond nuclear radiation detector comprising a diamond crystal plate and contacts on the opposite sides of said plate adapted for the application of an electric field to said diamond crystal plate. The contact on the side of the crystal plate to be irradiated in the course of detecting nuclear radiation is constituted as a blocking contact in relation to charge carriers, whereas the opposite contact is constituted of a meterial capable, in conjunction with the diamond plate, of injecting the charge carriers under the influence of the electric field. The thickness of the diamond crystal plate between the contacts does not exceed the maximum drift length of the charge carriers created by the detected nuclear radiation in the diamond crystal plate under the influence of the applied electric field corresponding to the maximum drift rate.

14 Claims, 2 Drawing Figures

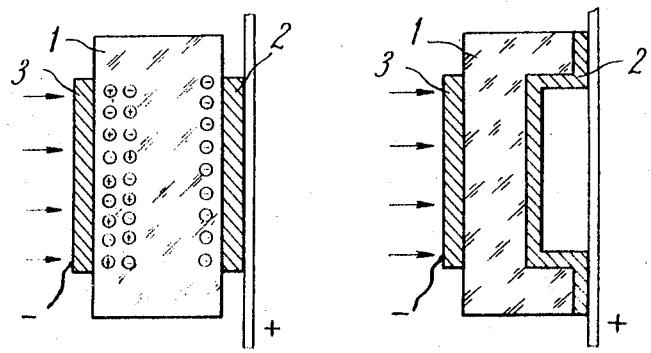

DIAMOND NUCLEAR RADIATION DETECTOR

The present invention relates to nuclear radiation detectors and methods of manufacturing said detectors.

There are known nuclear radiation detectors consisting of a crystal of natural diamond with a lower nitrogen content (the nitrogen concentration is usually less than $10^{19}$ atoms cm$^{-3}$) provided with electric contacts. When applying a potential difference across the diamond and irradiating it with nuclear particles from any side, current pulses are induced inside the crystal. These current pulses produce an external circuit voltage pulses which are amplified and counted by appropriate apparatus.

This behavior is shown only by a small number of diamond crystals and the counting properties of such detectors are diverse and uncontrollable. Such detectors have poor counting efficiency and low energy resolving power, and operate with incomplete collection of the charge carriers created in the crystal by incident nuclear particles. In addition, electric polarization occurs in these crystals, since the resistivity of said crystals is high. As a result, their counting properties deteriorate under irradiation. Known methods of removing polarization by heating or illumination with light of appropriate wavelengths are inconvenient and ineffective. For these reasons, the detectors on the basis of diamond have not found wide practical application.

It is an object of the present invention to produce the diamond detector that would operate at room and higher temperatures and possess good counting efficiency, complete charge collection and high energy resolution, as well as constancy of its properties under prolonged irradiation, said detector being made from a high resistivity diamond crystal and, hence, operating without increasing the noise level.

Another object of the invention is to develop a method of manufacturing said detector.

In the accomplishment of said and other objects of the invention, in the detector consisting of a diamond crystal plate with two electric contacts located at its opposite sides across which plate a potential difference is applied, according to the invention, the thickness of the operating range of the plate between the contacts does not exceed the distance traveled under the influence of the applied electric field by the charge carriers created by nuclear radiation in the diamond crystal. The contact through which the incident nuclear particles penetrate into the crystal is made blocking in relation to the charge carriers, while the opposite contact is made from a material capable, in conjunction with diamond, of injecting the charge carriers into the crystal under the influence of the electric field.

If the detector is made from diamond in which the distance traveled by electrons is longer than that travelled by holes, the contact on the unirradiated side of the plate should inject holes and the positive potential is applied to this contact. If the detector is made from diamond in which the distance traveled by electrons is less than that traveled by holes, the contact on the unirradiated side of the plate should inject electrons and the negative potential is applied to this contact.

In case the condition of complete charge collection is observed provided that the thickness of the diamond crystal plate is low, a recess is made in the thick plate of the crystal with a view to increasing the mechanical strength of the detector, the thickness of the bottom of said recess being equal to the distance traveled by the charge carriers.

As the experiments have shown, silver, gold, platinum and graphite may be used as a material insuring in conjunction with diamond a contact injecting holes. Such a contact may also be provided by the surface layer of the diamond crystal plate doped with aluminum or boron.

Graphite may serve as a material insuring in conjunction with the diamond a contact injecting electrons. This contact may also be provided by the surface layer of the diamond crystal plate doped with phosphorus, lithium or carbon.

Used as a material providing a blocking contact may be gold, silver or platinum. Such a contact may also be provided by the graphitized surface of the diamond crystal plate and by doping the surface layer of the plate with boron, aluminum, phosphorus, lithium and carbon. The formation of the blocking and injecting contacts is secured not only by using said materials, but also with the aid of applying to it the potential of appropriate polarity, as well as owing to the damage of the surface crystalline structure of the plate, such as in the case of graphitization or doping.

The present detector may be manufactured by the method wherein, according to the invention, a plate is cut off a diamond crystal, the thickness of the plate being equal to the distance traveled by the charge carriers in the crystal. With a view to prolonging the lifetime of the carriers, said plate is annealed in vacuum at 1,000° to 1,300° C. Prior to forming contacts the annealed plate of the diamond crystal is etched by heating in oxygen-containing medium in order to reduce the rate of surface recombination of the charge carriers, if necessary.

For forming the blocking and injecting contacts both sides of the crystal plate are covered with paint of silver, gold or platinum, and the plate is heated to a temperature of 500° to 700° C. The plate is held at this temperature for 2 to 3 hours in order to burn the metal into the plate.

Blocking and injecting contacts can be formed by applying to both sides of the crystal plate a solution of gold, silver or platinum salts and by heating the plate to a temperature of 500° to 700° C for several minutes in order to restore the metal.

For forming a graphite contact for injecting both electrons and holes, one side of the diamond crystal plate is covered with a colloidal graphite suspension, and the plate is heated in vacuum to a temperature of 500° to 600° C for about 3 hours.

A blocking contact is obtained by evaporating a film of gold, silver or platinum over one side of the plate. In some cases, for accomplishing a blocking contact the diamond crystal plate is graphitized by heating in vacuum of 0.1 torr for about 30 min at a temperature of 1,000° to 1,300° C.

For a better understanding of the invention, presented hereinbelow is the description of an exemplary embodiment thereof with reference to the accompanying drawings, wherein:

FIG. 1 shows the detector in accordance with the invention; and

FIG. 2 shows the detector of the invention consisting of a diamond crystal plate with a recess, provided with contacts.

The detector of the invention (FIG. 1) consists of a diamond crystal plate 1 on whose opposite sides the contacts 2 and 3 are provided. Said plate 1 is made from a diamond in which the distance traveled by the electrons is longer than that traveled by the holes. Therefore, the contact 2 is made from silver which, in conjunction with the diamond and under the influence of the positive potential applied to it, injects holes into the diamond crystal. The opposite contact 3 made from gold is a blocking contact in relation to the charge carriers when the negative potential is applied to it.

Nuclear radiation entering the detector from the side of the blocking contact 3 causes ionization inside the diamond crystal. The resulting charge carriers, i.e. the electrons and holes, move to the contacts under the influence of the applied field, the electrons moving to the contact 2, and the holes traveling to the contact 3. The thickness of the crystal plate 1 does not exceed the distance traveled by the charge carriers in the diamond crystal under the influence of the applied field. In the case of detectors, operating with complete charge collection, high energy resolution and good counting efficiency, the following condition should be observed, $$d < \delta = \tau E,$$

where $\mu$ is the mobility of the charge carriers, $\tau$ is the lifetime of the charge carriers, $E$ is the applied field strength, $\delta$ is the distance traveled by the charge carriers under the influence of the applied field, and $d$ is the thickness of the diamond crystal plate.

It is well known that in diamonds, in which the nitrogen concentration determined by optical absorption at a wavelength of 7.8 μ is less than $10^{19}$ atoms cm$^{-3}$, the mobility of electrons is about 2,000 cm$^2$ V$^{-1}$sec$^{-1}$ at room temperature, while the mobility of holes is about 1,500 cm$^2$V$^{-1}$ sec$^{-1}$. In the purest diamond crystals the lifetime of the charge carriers ranges from $10^{-9}$ to $10^{-8}$ sec. The experiments have shown that the mobility of electrons and holes in the diamond at high electric fields decreases as the field is increased, at first proportional to $E^{-1/2}$, then proportional to $E^{-1}$ beginning with a field strength of $10^4$V cm$^{-1}$ for electrons at room temperature. Thus, the drift velocity μE saturates at high fields and its limit for electrons is $10^7$cm sec$^{-1}$ at room temperature. Consequently, at the lifetime of the charge carriers of $10^{-8}$ sec the diamond crystal plate for the detector operating with complete charge collection has the optimum thickness of 0.2 to 0.3 mm. At the shorter lifetime of the charge carriers the diamond crystal plate should be thinner and its thickness is estimated in accordance with the above equation.

On their movement to the contact 2 some electrons are trapped by traps always present in the crystal. As a result, the diamond crystal plate polarizes. The injecting contact 2 is designed to remove said polarization. Since deep traps are present in the diamond, the injection currents from the contact 2 are limited by space charge accumulated by said traps. Thus, the injection currents do not induce significant conductivity and, consequently, noise. However, when field and charge equilibrium inside the crystal is disturbed due to polarization created by incident nuclear radiation, charge emission from the contact 2 restores the initial steady state of the crystal. Since the higher field strength within the ionization zone favors the reduction of losses in the electron-hole plasma when using the detector for counting the nuclear particles with low penetration, the blocking contact 3 should be located on the irradiated side of the plate 1.

The charge carriers, holes, which move to the blocking contact 3 under the influence of the applied field may also be trapped. In this case, however, the trapped holes are in the ionization zone and can be neutralized by the charge carriers of opposite sign, i.e. by electrons.

Thus, the present detector operates with complete charge collection and does not polarize under prolonged irradiation due to the thickness of the diamond crystal plate which does not exceed the distance traveled by the charge carriers and the appropriate contact system is provided.

In like manner, the detector can be manufactured from the diamond crystal in which the distance traveled by electrons is less than that traveled by holes. The difference is that the contact on the irradiated side is a blocking contact in relation to electrons and the positive potential is applied to it, whereas the opposite contact injects electrons and the negative potential is applied to it.

The detector shown in FIG. 2 is made from a diamond crystal plate whose thickness is considerably larger than the distance traveled by the charge carriers. A recess is made therefore in the crystal plate, the thickness of the bottom of said recess not exceeding the distance traveled by the charge carriers. This detector operates in the same way as the detector described above, has greater mechanical strength owing to the thickened peripheral area and is more convenient in handling.

The diamond detector described hereinabove is made from natural diamond with a nitrogen content less than $10^{19}$ atoms cm$^{-3}$. The selection of crystals for making detectors is based on the estimation of the mean lifetime of the charge carriers throughout the crystal by measuring a photocurrent value at a wavelength of 250 mμ. The photoconductivity at 250 mμ is imperfection photoconductivity and the optical absorption coefficient at 250 mμ has a value ranging from 5 to 15 cm$^{-1}$. Under these conditions one may consider, with an accuracy of 50 percent, that the light is completely absorbed in said crystals. Then, the mean lifetime of the charge carriers throughout the crystal can be estimated on the value of photocurrent, without measuring the absorption coefficient. The crystals with the mean lifetime longer than $10^{-9}$ sec are selected for making the detectors.

The selected crystals are cut in plates 0.1 to 0.3 mm thick. After cutting, the plates are placed in $10^{-6}$ torr vacuum and annealed for 6 to 8 hours at a temperature ranging from 1,000° to 1,300° C. In some cases, the thermal treatment increases the lifetime of the charge carriers considerably.

In the annealed plates the lifetime of the charge carriers is once more estimated by using the same technique, but at wavelengths of 225 and 220 mμ. The edge absorption begins in the diamond at these wavelengths. The absorption coefficients are 20 and 1,000 cm$^{-1}$, respectively. The mean lifetime of the charge carriers throughout the crystal is estimated on the value of photocurrent at 225 mμ, whereas the effect of surface recombination upon the value of photoconductivity is estimated at a wavelength of 220 mμ (the depth of light penetration is about 20μ).

The plates with the mean lifetime throughout the crystal of the order of $10^{-8}$ sec and higher are selected for further treatment.

In some cases, surface recombination is significant. The reduction of the rate of surface recombination is obtained by oxygen etching the specimens in the atmosphere for several minutes at a temperature of 800° to 900° C. If the thickness of the diamond plate after cutting, annealing and etching is larger than necessary for the operation of the detector with complete charge collection, the plate is thinned to the desired thickness, for example, by polishing, grinding or etching.

After mechanical treatment the crystal plate is subjected to thermal treatment as it has been described hereinabove and to etching.

Then, contacts are applied to the prepared plate. The simplest method of obtaining a contact for injecting holes on one side of the plate consists in applying silver paint with subsequent burning it into the plate in the atmosphere at about 600° C during 2 to 3 hours. A blocking contact is formed by evaporating a film of gold over the opposite side of the plate in vacuum at room temperature.

In like manner, an injecting contact can be formed on one side of the plate by burning into the plate gold or platinum from paint. A contact for injecting holes is also formed by restoring platinum, silver or gold from a solution of their salts by heating the diamond crystal plate covered with said solution to a temperature in the range from 500° to 700° C for several minutes.

For the formation of a graphite contact injecting both electrons and holes a colloidal graphite suspension, such as Aquadag, is applied to one side of the diamond crystal plate and the plate is heated to a temperature ranging from 500° to 600° C in vacuum for about 3 hours. Then, over the opposite side of the plate a film of gold is evaporated for forming a blocking contact.

In some cases, a blocking contact has been obtained by graphitizing the diamond crystal plate by heating in the temperature range from 1,000° to 1,300° C in vacuum of 0.1 torr for about 30 min. Then, the resulting graphite layer has been removed from one side of the plate. A film of a colloidal graphite suspension has been applied to this side. Then the plate has been heated in vacuum at a temperature ranging from 500° to 600° C for obtaining an injecting contact. In like manner, an injecting contact can be obtained after the removal of said layer by burning into the plate silver from paint as described above. The present diamond detector for nuclear radiations has a number of advantages. It can detect the nuclear particles with the range up to $2 \times 10^{-2}$ cm and operates at room and higher temperatures. In addition, it possesses high energy resolving power of 7 percent at room temperature and counting efficiency of 100 percent. The detector operates with complete charge collection and does not polarize under prolonged irradiation.

We claim:

1. A diamond nuclear radiation detector comprising a diamond crystal plate having opposite sides one of which is irradiated; contacts on the irradiated and opposite sides of said plate adapted for applying a potential difference thereacross when detecting nuclear radiations, one of the contacts being adapted for the application of a positive potential, whereas the opposite contact is adapted for the application of a negative potential, said contacts and said plate being operatively associated with one another such that when the contact on the irradiated side of the diamond crystal plate is constituted as a blocking contact in relation to the charge carriers, the opposite contact is constituted as a material capable, in conjunction with the diamond plate, of injecting the charge carriers under the influence of the electric field and the thickness of said diamond crystal plate between said contacts is less than the maximum drift length of the charge carriers created by the nuclear radiation in the diamond crystal plate, under the influence of the applied electric field corresponding to the limit drift rate.

2. A diamond detector according to claim 1, wherein the diamond crystal plate has a recess, the thickness of whose bottom is less than the maximum drift length of the charge carriers.

3. A diamond detector according to claim 1, wherein the blocking contact is a graphatized surface layer of a diamond crystal plate.

4. A diamond detector according to claim 1, wherein the contact injecting holes and electrons is made from graphite.

5. A diamond detector according to claim 1 wherein the diamond crystal plate has a maximum drift length of electrons exceeding the maximum drift length of holes, and wherein the contact of positive potential is constituted as a material capable, in conjunction with diamond, of injecting holes.

6. A diamond detector according to claim 5, wherein the blocking and hole-injecting contact is silver.

7. A diamond detector according to claim 5, wherein the blocking and hole-injecting contact is gold.

8. A diamond detector according to claim 5, wherein the blocking and hole-injecting contact is platinum.

9. A diamond detector according to claim 5, wherein the blocking and hole-injecting is a surface layer of the diamond crystal plate doped with boron.

10. A diamond detector according to claim 5, wherein the blocking and hole-injecting is a surface layer of the diamond crystal plate doped with aluminum.

11. A diamond detector according to claim 1, wherein the diamond crystal plate has a maximum drift length of electrons less than the maximum drift length of holes, and wherein the contact of negative potential is constituted as a material capable, in conjunction with diamond, of injecting electrons.

12. A diamond detector according to claim 11, wherein the blocking and electron-injecting is a surface layer of the diamond crystal plate doped with phosphorus.

13. A diamond detector according to claim 11, wherein the blocking and electron-injecting is a surface layer of the diamond crystal plate doped with lithium.

14. A diamond detector according to claim 11, wherein the blocking and electron-injecting is a surface layer of the diamond crystal plate doped with carbon.

* * * * *